United States Patent [19]

Ina

[11] Patent Number: 4,786,974

[45] Date of Patent: Nov. 22, 1988

[54] IMAGE INFORMATION PROCESSING SYSTEM

[75] Inventor: Kenzoh Ina, Yokohama, Japan

[73] Assignee: Canon Kabushiki Kaisha, Tokyo, Japan

[21] Appl. No.: 713,820

[22] Filed: Mar. 20, 1985

[30] Foreign Application Priority Data

Mar. 26, 1984 [JP] Japan ................................ 59-56218
Mar. 26, 1984 [JP] Japan ................................ 59-56219

[51] Int. Cl.⁴ ............................................ H04N 1/32
[52] U.S. Cl. .................................... 358/257; 358/286; 358/293; 358/260
[58] Field of Search ............... 358/256, 257, 260, 261, 358/280, 286, 293

[56] References Cited

U.S. PATENT DOCUMENTS 4,494,149 1/1985 Furukawa ........................... 358/257
4,604,653 8/1986 Shimizu .............................. 358/257
4,638,638 1/1987 Shimizu et al. ..................... 358/256

*Primary Examiner*—Edward L. Coles, Sr.
*Attorney, Agent, or Firm*—Fitzpatrick, Cella, Harper & Scinto

[57] ABSTRACT

An image information processing system is provided with an image reading unit, a memory unit, a signal compression unit and a transmission unit mutually connected through a bus line, for image formation inside the system or information transfer to or from an external system.

19 Claims, 4 Drawing Sheets

IMAGE INFORMATION PROCESSING SYSTEM

BACKGROUND OF THE INVENTION

1. Field of the Invention

The present invention relates to an image information processing system, and more particularly to such system equipped with various image processing units such as image information input/output units, image memory, etc.

2. Description of the Prior Art

There are already proposed various image processings such as printing, transmission or storage through electrical handling of image information.

Such various image processings can be achieved advantageously in cost and space by a system having plural functions, rather than by plural apparatus designed for respective functions.

However, the incorporation of plural functions into a system requires matching of said functions, for example in speed thereof, and poses certain limitation in the system structure.

Also it has not been possible to execute other functions while a function is in execution.

Further, such a system has often been inconvenient for the operator as an identical starting procedure has to be repeated for each function.

Furthermore, the system structure has been complex since the control signals for controlling the function of various blocks constituting the system and the image information exchanged among said blocks are transmitted through separate lines.

SUMMARY OF THE INVENTION

In consideration of the foregoing, an object of the present invention is to provide an image processing system capable of improving the efficiency of image processing and improving the compatibility among plural systems.

Another object of the present invention is to provide an image processing system in which plural functions are effectively combined.

Still another object of the present invention is to provide an image processing system allowing the system to start in a manner suitable for each function.

The foregoing and still other objects of the present invention, and the advantages thereof will become fully apparent from the following description.

DETAILED DESCRIPTION OF THE PREFERRED EMBODIMENTS

Figure 1:
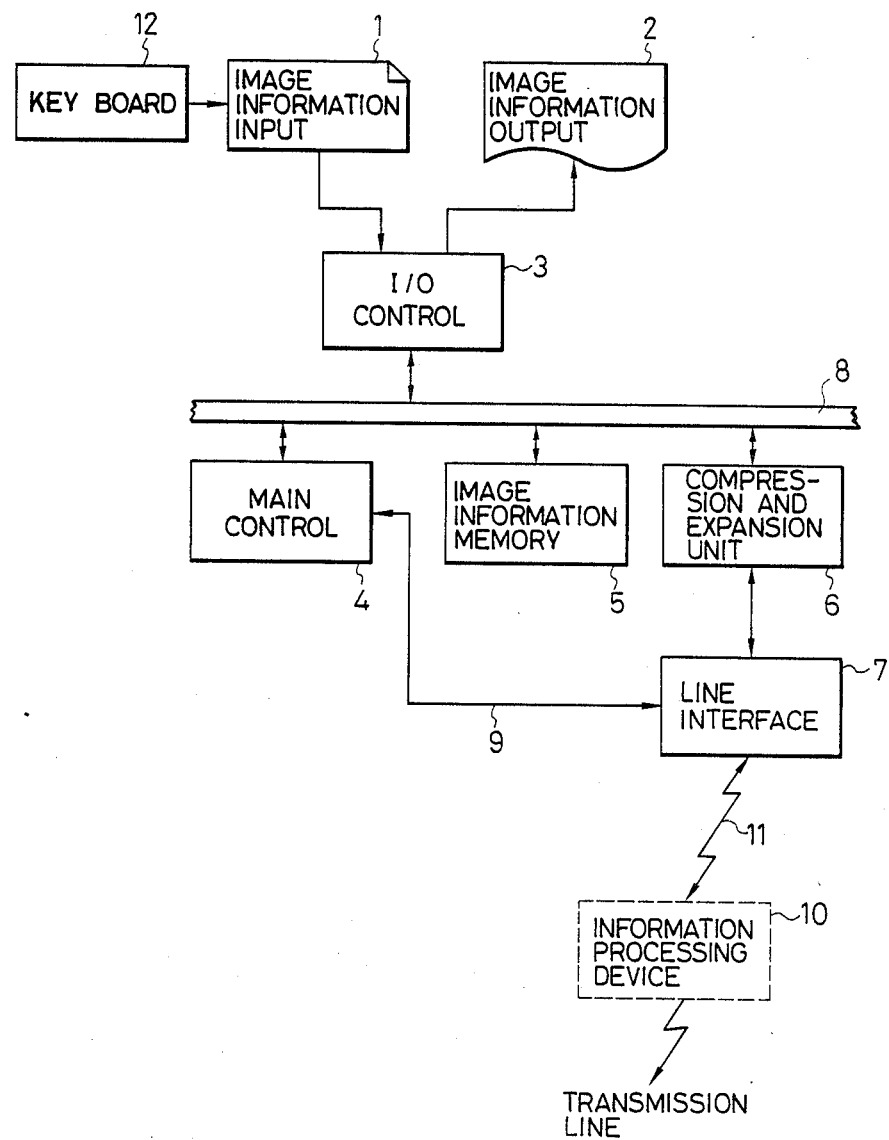
FIG. 1 is a block diagram of an image information processing system embodying the present invention.

FIG. 1 shows a block diagram of an image information processing system embodying the present invention, wherein provided are an image information input unit 1 for reading an original image by photoelectric conversion with an image sensor such as a charge-coupled device (CCD); an image information output unit 2, such as a laser beam printer, for print operation in response to image information; an input/output control unit 3 for said input unit 1 and output unit 2; a main control unit 4 composed of a conventional microcomputer; an image information memory 5 composed of a semiconductor memory or a floppy disk device, having a memory capacity of at least one page of image information; a compression and expansion unit 6 composed of a compression unit and an expansion unit for applying known compression such as modified Haffman encoding and known expansion to the image information; an interface unit 7 for data communication with a host information processing apparatus composed of a large computer; an internal bus line 8 connecting said input-/output control unit 3, main control unit 4, image information memory 5 and compression/expansion unit 6 for data communication among said units; a control signal line 9 between the main control unit 4 and the interface unit 7; a host information processing apparatus 10 capable of processing image information and other various code information including characters, numerals, symbols, etc.; an interface cable 11 connecting the interface unit 7 and the host information processing unit 10; and a keyboard 12 provided in the input/output control unit 3 eventually including a display unit.

The image information input and output units 1, 2 are operable either in off-line mode independently from the host information processing unit 10, or in on-line mode as an image input/output unit for information exchange with the host unit.

Consequently, even when the host unit is executing another program, the image input/output units 1, 2 can be operated as a copier.

The main control unit 4 controls the function of various units connected to the bus line 8 by supplying control signals through said bus line 8.

In the following there will be explained the function of the system shown in FIG. 1.

Figure 2:
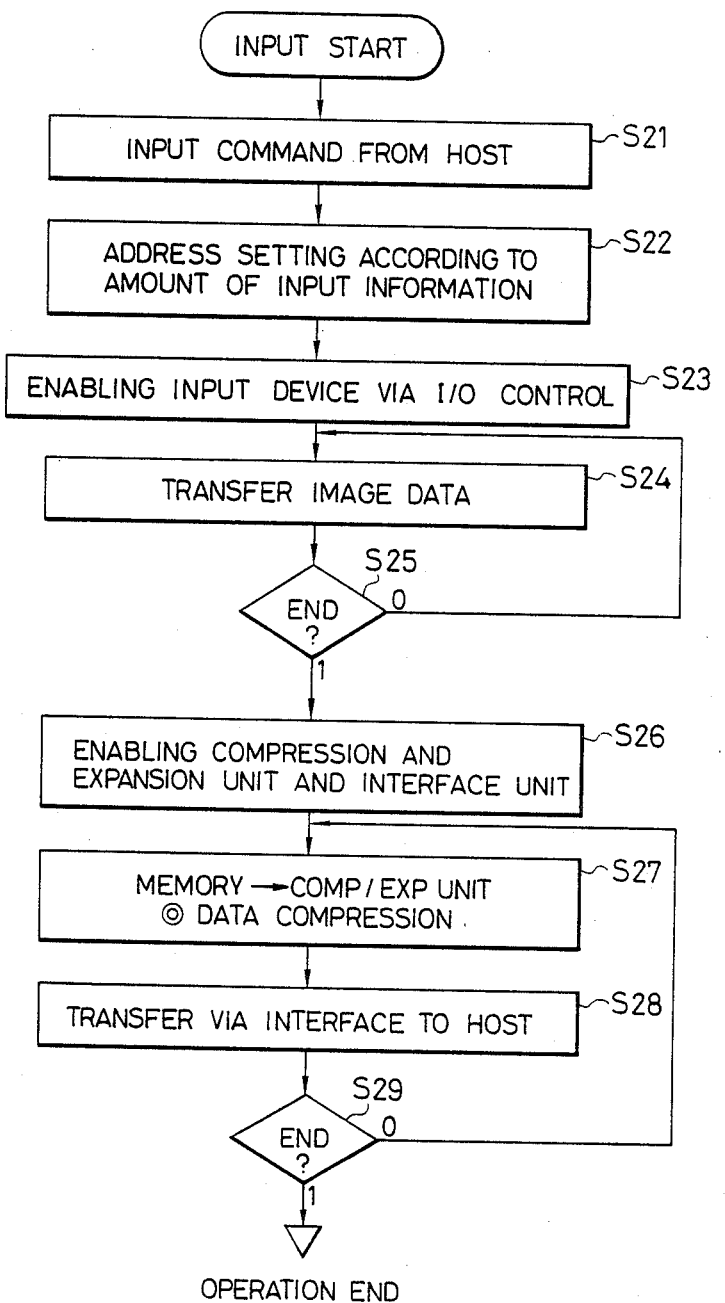
FIG. 2 is a flow chart for input control.

At first reference is made to FIG. 2, for explaining the function of the main control unit 4 in the case of entering image information and transferring said information to the host information processing unit 10. This program is stored in advance in a read-only memory ROM of the microcomputer of the main control unit 4.

At first, in a step S21, the host information processing unit 10 supplies the main control unit 4 with a start command for the image information input unit 1, through the line interface unit 7. In a step S22, the main control unit 4 determines a start address in the image information memory 5 according to the amount of information, or image size, to be entered. The size of the information to be entered is manually set or determined through an automatic detecting function. In a step S23, the main control unit 4 transmits the start command to the image information input unit 1 through the input-/output control unit 3, whereby said input unit 1 starts the reading of an original image. Then, in a step S24 the information, or image data, entered from the image information input unit 1 is transferred, through the input/output control unit 3 and the internal bus line 8, to the image information memory 5 and stored therein beginning at an address determined in the above-described manner.

When the storage of input information into the memory 5 is completed in a step S25, a start command is given to the image information compression/expansion unit 6 and the interface unit 7 in a step S26. Then a step S27 effects the read-out of the information from the image information memory 5. The information thus read is supplied to the compression/expansion unit 6 for data compression, and is transferred, in a step S28, to the host information processing unit 10 through the interface unit 7. The host unit stores said information in a disk device, transmits it to a communication line such as a public telephone line or transfers it to another information processing apparatus through a local area network.

Figure 3:
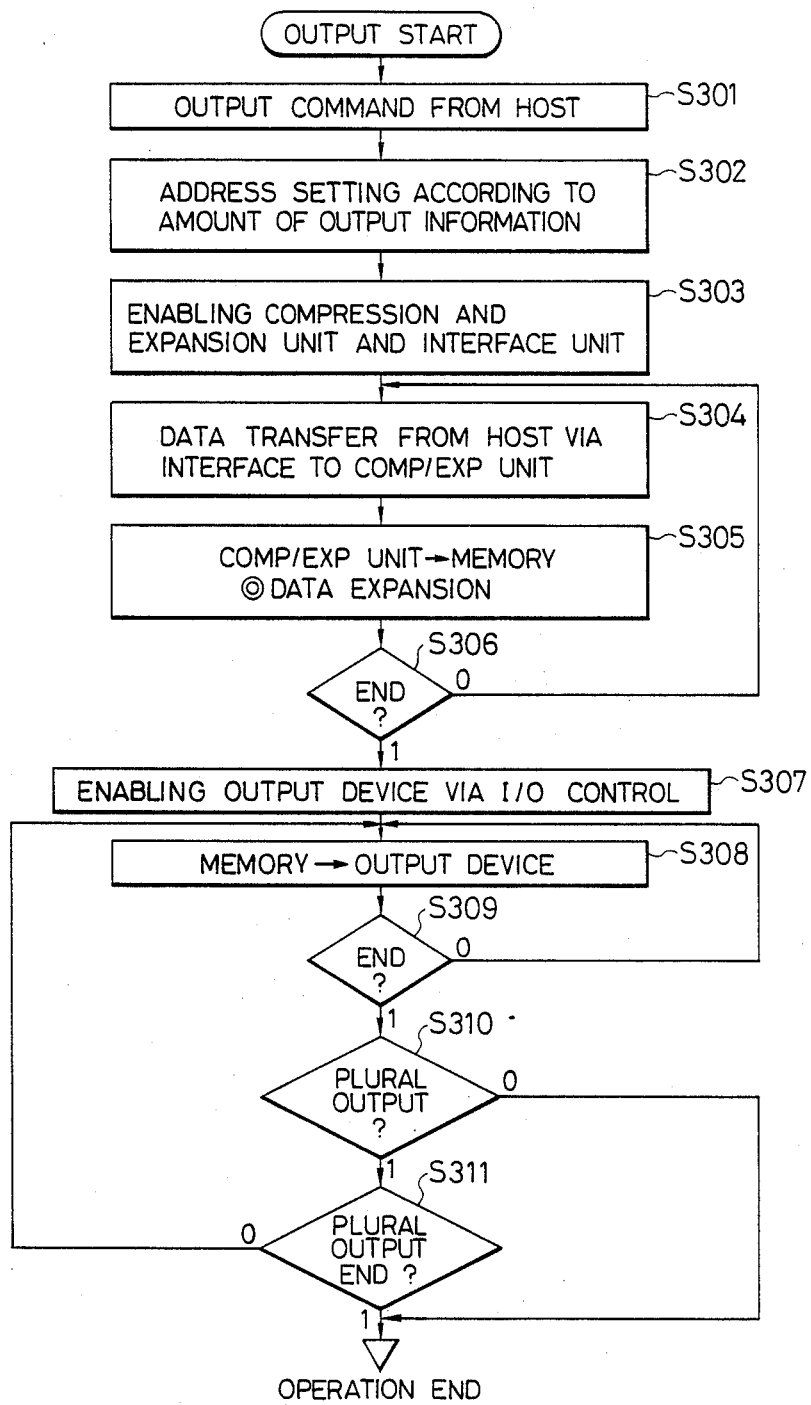
FIG. 3 is a flow chart for output control.

Now reference is made to FIG. 3 for explaining the function of the main control unit 4 in the case of information transmission from the host unit to the apparatus of the present invention. This program is also stored in the read-only memory of the main control unit 4.

Initially, in a step S301, the host information processing unit 10 supplies the main control unit 4 with a start command for the image information output unit 2 through the line interface unit 7. In a step S302, the main control unit 4 determines a start address of the image information memory 5 according to the amount of information, or size of image, to be supplied from the host unit. Then, in a step S303, the main control unit 4 transmits a start command to the compression/expansion unit 6 and the interface unit 7 through the input/output control unit 3. In a step S304 compressed image information is transmitted from the host information processing unit 10 to the compression/expansion unit 6 through the interface unit 7, and in a step S305 said information is stored, with expansion, in the image information memory 5 through the internal bus line 8. When the storage of image information in the memory 5 is completed in a step S306, the main control unit 4 transmits, in a step S307, a start command to the image information output unit 2 through the input/output control unit 3, whereby said output unit 2 initiates preparatory and printing operations. In steps S308–S311, the image information is read from the image information memory 5, supplied to the image information output unit 2 through the internal bus line 8 and input/output control unit 3 and printed on a sheet. It is therefore possible, in response to a single data transmission from the host unit, to obtain identical images on plural sheets by repeating the data flow from the image information memory 5 to the output unit 2 through the input/output control unit 3. In the step S301, the host information processing unit 10 transmits instructions such as form and number of output to the main control unit 4, which in response selects the sheet size and controls the number of output operations.

In this manner the presence of the image information memory in the system enables plural outputs to be obtained in continuous manner from a single transfer of image information from the host unit or from the image information input unit.

Figure 4:
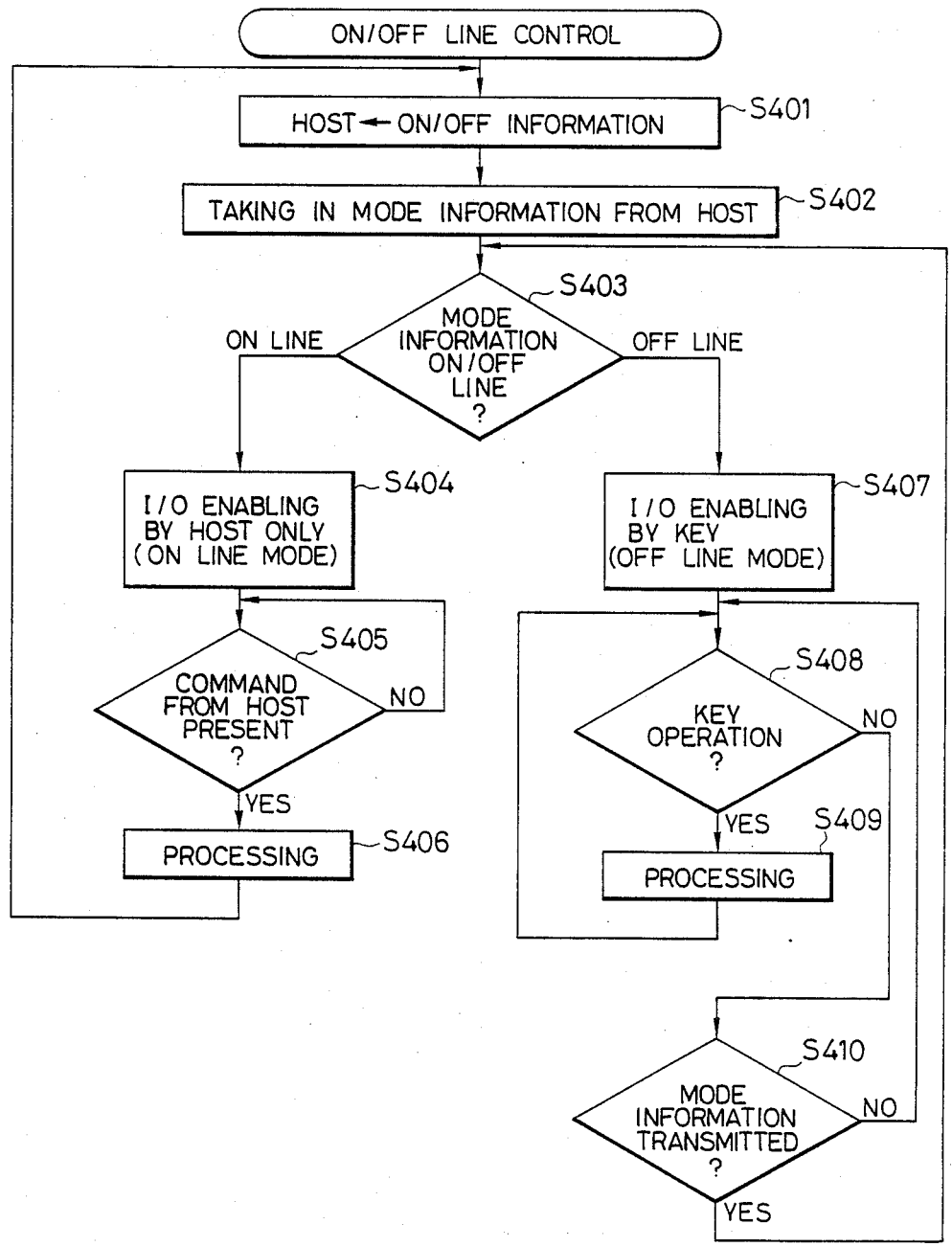
FIG. 4 is a flow chart for on/off-line control.

Now reference is made to FIG. 4 for explaining the function of the main control unit 4 in the on-line/off-line control. Also this program is stored in the read-only memory of the main control unit 4.

As explained before, the image information input unit 1 and the image information output unit 2 shown in FIG. 1 can perform functions as a copying device, or for image information input in the memory 5 or image information output from said memory 5, independently from the host information processing unit 10. Such functions called off-line mode. On the other hand, the function of the image information input unit 1 and the output unit 2 for information input into or information output from the host information processing unit 10 is called on-line mode.

The selection of said on- and off-line modes is made by the operator through the keyboard shown in FIG. 1.

In the present embodiment, the image input/output operations to or from the host unit, or the off-line mode operations are preferentially selected, and the system is normally set to the on-line mode so that a command from the host unit can be immediately met. However, it is also possible to set the system to the off-line mode in the normal state and to switch the system to the on-line mode only when requested by the host unit.

Initially, in a step S401, the main control unit 4 supplies the host information processing unit 10 with an on/off signal, indicating the on-line mode or off-line mode, according to the mode selection made through the keyboard. Then, in a step S402, it receives a mode command from the host information processing unit 10 through the interface unit 7. In a step S403, the main control unit 4 determines the mode command. In the case of on-line mode, the main control unit 4 enables, in a step S404, the host unit alone to activate the image information input unit 1 and the image information output unit 2, then awaits a command from the host unit in a step S405, and executes, in a step S406, either the procedure of S21–S28 shown in FIG. 2 or of S301–S311 shown in FIG. 3.

On the other hand, if the off-line mode is identified in the step S403, the main control unit 4 instructs the execution of the off-line mode, in a step S407, to the host information processing apparatus 10 through the interface unit 7, and enables the start of the image information input unit 1 and the output unit 2 through a start key of the keyboard 12. Then, in a step S408, the main control unit 4 detects, through the input/output control unit 3, the key operation of the operator on the keyboard 12 equipped in the input unit 1, whereby the processing of image information is rendered possible, in a step S409, without command from the host information processing unit 10.

For example the function as a copier is achieved by transferring the information from the input unit 1 to the output unit 2 without transfer to the image information memory 5. In case of obtaining plural outputs from a same image, the information from the input unit 1 can be stored in the image information memory 5, in the same manner as in the aforementioned control for plural outputs.

In case of executing for example a copying function through the off-line mode, the necessary parameters such as size and number of copies are determined by the operator through the keyboard 12.

If there is no key operation in a step S408 after the execution of processing in the off-line mode or after the switching to the off-line mode, the program proceeds to step S410 to await the mode information from the host unit, and the program returns either to the step S403 in the presence of said information or to the step S408 in the absence thereof.

In the present embodiment, the presence of the image information memory in the system allows the input information of an arbitrary image size to be printed in an arbitrary position on a recording sheet of an arbitrary size. For example, for an input information of A4 size, the output sheet size can be arbitrarily selected by instructing, from the host unit, the address of the memory for starting the storage, thereby moving the image information to a position suitable for output. This function is achieved in the main control unit, by processing the image size information and the output sheet size information contained in the control information transferred from the host unit to determine the start address in the image information memory, storing the image information from said start address, and transferring the image information starting from a memory address matching the output sheet size to the output unit.

As explained in the foregoing, there is provided an image information processing apparatus capable of processing input/output information of high quality and minimizing the quantity of data transmission with a host information processing unit by compression and expansion of image information.

Also said image information processing apparatus is capable of input and output of the image information independently from the host information processing unit.

The system shown in FIG. 1 is provided with the image information input unit and the output unit, but either one alone may be provided according to the status or use of the system. Also it is possible to increase the number of each unit, for example to employ plural input units.

Furthermore, the bus line 8 may be connected to other information processing apparatuses such as word processors, personal computers, or image files such as optical disk devices.

Although the present invention has been explained by preferred embodiments thereof, it is not limited to such embodiments but is subject to various modifications within the scope and spirit of the appended claims.

What is claimed is:

1. An image information processing system comprising:
   read means connected to a bus line for reading an original image by photoelectric conversion and supplying image information representing the original image to said bus line;
   memory means connected to said bus line for storing the image information received from said read means through said bus line;
   compression means connected to said bus line for compressing the image information received from said read means through said bus line;
   communication means for transmitting the image information compressed by said compression means to an external apparatus and for receiving start command data from said external apparatus; and
   control means for controlling the operation of said read means, said memory means, said compression means, and said communication means, wherein said control means causes said read means to read the original image in response to start command data from said external apparatus and causes the communication means to transmit the compressed image information to said external apparatus.

2. An image information processing system according to claim 1, wherein said memory means is adapted to store at least one page of image information.

3. An image information processing system according to claim 1, wherein said compression means is adapted to start compressing operation after the completion of storage by said memory means of the image information supplied from said read means.

4. An image information processing system according to claim 1, wherein said control means supplies control data for controlling the operation of said read means, said memory means and said compression means through said bus line.

5. An image information processing system comprising:
   communication means for receiving image information subjected to a compression process and command data from an external apparatus;
   expansion means connected to a bus line for expanding the compressed image information received by said communication means and for supplying image information to said bus line;
   memory means connected to said bus line for storing the image information received from said expansion means through said bus line;
   image information means connected to said bus line for forming an image in accordance with the image information received from said memory means through said bus line; and
   control means for controlling the operation of said communication means, said expansion means, said memory means, and said image formation means, wherein said control means causes said memory means to repeatedly read out the same image information in accordance with said command data from said external apparatus instructing the performance of a plurality of image formation operations so as to effect image formation of the same image information a plurality of times.

6. An image information processing system according to claim 5, wherein said image forming means is adapted to record an image on a recording material in response to the received image information.

7. An image information processing system according to claim 5, wherein said memory means is adapted to store at least one page of image information.

8. An image information processing system according to claim 5, wherein said image forming means is adapted to initiate an image forming operation after the completion of storage by said memory means of the image information supplied by said expansion means.

9. An image information processing system according to claim 5, wherein said control means supplies control data for controlling the operation of said expansion means, said memory means and said image formation means through said bus line.

10. An image information processing system comprising:
    read means for reading an original image and supplying image information representing the original image;
    image forming means for forming an image in accordance with the image information supplied by said read means;
    communication means for transmitting the image information supplied by said read means to an external apparatus and for receiving start command data from said external apparatus;
    selection means for selecting one of a first and second mode, wherein said image forming means forms an image in accordance with the image information in the first mode and said communication means transmits the image information to said external apparatus in the second mode;
    input means for inputting an instruction; and
    control means for controlling the operation of said read means, said image forming means, and said communication means in accordance with one of the first and second modes selected by said selection means, wherein said control means initiates said operations in response to the instruction from said input means in the first mode and wherein said control means initiates said operations in response to start command data from said external apparatus in the second mode.

11. An image information processing system according to claim 10, wherein said image forming means is adapted to record an image on a recording material in accordance with the supplied image information.

12. An image information processing system according to claim 10, wherein said control means supplies control data for controlling the operation of said read means and said image forming means through a bus line, and wherein the image information is supplied through the bus line.

13. An image information processing system according to claim 10, further comprising memory means for storing the image information supplied from said read means, wherein said image forming means or said communication means receives the image information through said memory means.

14. An image information processing system according to claim 10, wherein said read means and said communication means are connected through a bus line.

15. An image information processing system comprising:
read means for reading an original image and supplying image information representing the original image;
communication means for receiving image information and command data from an external apparatus and for supplying the received image information;
image forming means for forming an image in accordance with the image information supplied by said read means for said communication means;
selection means for selecting one of a first and second mode, wherein said image forming means forms an image in accordance with the image information supplied by said read means in the first mode and said image forming means forms an image in accordance with the image information supplied by said communication means in the second mode;
input means for inputting an instruction; and
control means for controlling the operation of said read means, said communication means and said image forming means in accordance with one of the first and the second mode selected by said selection means, wherein said control means initiates said operations in response to the instruction from said input means in the first mode and said control means is adapted to initiate said operations in response to start command data from said external apparatus in the second mode.

16. An image information processing system according to claim 15, wherein said image forming means is adapted to record an image on a recording material in accordance with the supplied image information.

17. An image information processing system according to claim 15, wherein said control means supplies control data for controlling the operation of said read means and said image forming means through a bus line, and wherein the image information is supplied through the bus line.

18. An image information processing system according to claim 15, further comprising memory means for storing the image information to be supplied to said image forming means, wherein the image information from said read means or from said communication means is temporarily stored in said memory means.

19. An image information processing system according to claim 15, wherein said image forming means and said communication means are connected through a bus line.

* * * * *

UNITED STATES PATENT AND TRADEMARK OFFICE
CERTIFICATE OF CORRECTION

PATENT NO. : 4,786,974

DATED : November 22, 1988

INVENTOR(S) : KENZOH INA

Page 1 of 2

It is certified that error appears in the above-identified patent and that said Letters Patent is hereby corrected as shown below:

COLUMN 1

Line 54, "control;" should read --control; and--.

COLUMN 2

Line 6, "Haffman" should read --Huffman--.
Line 21, "eventually" should read --optionally--.

COLUMN 3

Line 24, "unti 6" should read --unit 7--.
Line 62, "functions" should read --function is--.

COLUMN 6

Line 9, "image information" should read --expanded image information--.
Line 13, "image information" should read --image forming--.

UNITED STATES PATENT AND TRADEMARK OFFICE
CERTIFICATE OF CORRECTION

PATENT NO. : 4,786,974

DATED : November 22, 1988

INVENTOR(S) : KENZOH INA

Page 2 of 2

It is certified that error appears in the above-identified patent and that said Letters Patent is hereby corrected as shown below:

COLUMN 7

Line 34, "for" should read --or--.

Signed and Sealed this

First Day of August, 1989

Attest:

DONALD J. QUIGG

Attesting Officer

Commissioner of Patents and Trademarks